US006666946B2

(12) United States Patent
Pekurovsky et al.

(10) Patent No.: US 6,666,946 B2
(45) Date of Patent: Dec. 23, 2003

(54) METHOD OF HIGH SPEED COATING PIGMENT-CONTAINING LIQUID COATING MATERIALS

(75) Inventors: Mikhail L. Pekurovsky, Bloomington, MN (US); Shannon D. Sharp, Woodbury, MN (US); Paul J. Toftness, St. Paul, MN (US); Ian D. Gates, Calgary (CA); James A. Smart, Nevada, MO (US)

(73) Assignee: 3M Innovative Properties Company, St. Paul, MN (US)

( * ) Notice: Subject to any disclaimer, the term of this patent is extended or adjusted under 35 U.S.C. 154(b) by 53 days.

(21) Appl. No.: 09/808,209

(22) Filed: Mar. 14, 2001

(65) Prior Publication Data

US 2002/0129766 A1 Sep. 19, 2002

(51) Int. Cl.[7] ............................ C09J 5/04; B32B 31/00; B05D 1/02; B05D 1/28

(52) U.S. Cl. ........................ 156/305; 156/344; 427/189; 427/194; 427/211; 427/428; 427/447; 428/40.2; 428/41.2; 428/41.8; 428/42.1; 428/343

(58) Field of Search ................................ 156/302, 305, 156/344; 427/189, 190, 194, 211, 447, 452, 453, 428, 424, 425, 427; 118/56, 244, 257, 258, 259, 303, 322; 428/40.2, 41.2, 41.8, 42.1, 343

(56) References Cited

U.S. PATENT DOCUMENTS

| | | | | |
|---|---|---|---|---|
| 2,575,046 A | | 11/1951 | Chavannes et al. | |
| 3,873,390 A | * | 3/1975 | Cornell et al. | 428/446 |
| 4,526,910 A | * | 7/1985 | Das et al. | 523/220 |
| 5,178,912 A | * | 1/1993 | Piacente et al. | 118/244 |
| 5,313,884 A | | 5/1994 | Lerner et al. | 101/348 |
| 5,409,732 A | | 4/1995 | Leonard et al. | 427/10 |
| 5,580,532 A | | 12/1996 | Robinson et al. | 422/179 |
| 5,609,932 A | | 3/1997 | Goetz et al. | 428/36.91 |
| 5,624,715 A | * | 4/1997 | Gueggi et al. | 427/420 |
| 5,666,726 A | | 9/1997 | Robinson et al. | 29/890 |
| 5,780,109 A | * | 7/1998 | Yapel et al. | 427/294 |
| 5,811,063 A | | 9/1998 | Robinson et al. | 422/179 |
| 5,866,079 A | | 2/1999 | Machida | 422/179 |

FOREIGN PATENT DOCUMENTS

| | | | | |
|---|---|---|---|---|
| EP | 0266109 B1 | | 7/1993 | |
| EP | 0773472 | | 5/1997 | |
| JP | 10034067 A | * | 2/1998 | B05D/1/28 |
| JP | 2798871 | | 9/1998 | |
| JP | 2798874 | | 9/1998 | |
| WO | WO88/07416 | | 10/1988 | |
| WO | WO89/04218 | | 5/1989 | |
| WO | WO94/03337 | | 2/1994 | |

OTHER PUBLICATIONS

Hare, C., Protective Coatings—Fundamentals of Chemistry and Composition, Technology Publishing Co., Pittsburgh, PA, 1994, pp. 86–87; 456–458.

Payne, H., Organic Coating Technology, John Wiley & Sons, Inc., 1965, pp. 515–517; 1247.

* cited by examiner

*Primary Examiner*—Curtis Mayes
*Assistant Examiner*—Sing P Chan
(74) *Attorney, Agent, or Firm*—Jean A. Lown

(57) ABSTRACT

Methods of high speed coating a pigment-containing liquid coating material onto a substrate so as to avoid visible pigment separation in the coating material in its as coated state. In the method, a pigment-containing liquid coating material is applied to a substrate, while the substrate is moving at a high line speed of at least about 15.24 m/min., to form a coated layer. The coating material is applied to the substrate along a substantially straight, dynamic wetting line where the coating material first contacts the moving substrate. The coating material is of the type that will exhibit visible pigment separation on its interface surface when the coating material is coated onto the fast moving substrate, without the use of a substantially straight wetting line. The wetting line is substantially straight when a significant amount of visible pigment separation does not occur at the chosen high line speed.

26 Claims, 4 Drawing Sheets

METHOD OF HIGH SPEED COATING PIGMENT-CONTAINING LIQUID COATING MATERIALS

FIELD OF THE INVENTION

The present invention is related generally to coating pigment-containing materials on substrates. More specifically, the present invention is related to the high speed coating of pigment-containing liquid coating materials on webs or liners. Even more specifically, the present invention is related to high speed coating of such pigmented coating materials so as to avoid visible pigment separation. The present invention finds one use in coating liquid organosol pigment materials onto webs or liners.

BACKGROUND OF THE INVENTION

Films, tapes, and other substrates have long been coated with colored pigment-containing liquid coating materials. Thin, flexible substrates such as, for example, films, webs or liners have been coated using roll coating techniques which often include rolls for feeding, coating, and taking up the finished, coated product. Roll coating methods have included applying a coating material using a rotating applicator roll that transfers the coating material from a feed pan to a moving substrate. The substrate is usually positioned over a feed roll so that when the feed roll is rotated the substrate is moved longitudinally past the applicator roll. The feed and applicator rolls are positioned so that the coating material is at least partially transferred from the applicator roll to form a coated layer on the moving substrate. Die coating techniques have also been used to apply such liquid coating materials to a substrate. In a typical die coating process, the coating material is applied to the surface of the moving substrate through a die.

Colored coating materials typically include pigments that are generally dispersed or suspended evenly throughout a liquid so as to provide an even color to the coating material. When the pigmented coating is applied to a substrate, an even color appearance is preferable for most applications, and is required by many others.

Colored coatings made using conventional methods have been known to exhibit an uneven color appearance during some production runs. The uneven color appearance can take the form of streaks, swirls or other shapes having a color intensity that is different than that of the surrounding coated layer. The streaking is typically oriented in the machine or longitudinal direction and visible with normal unaided human eyesight. The uneven color appearance has been found on the interface surface or underside of the coated layer (i.e., the surface of the coated layer that is formed on the moving substrate) and, therefore, can go unnoticed until after the coated layer has been formed and cured. In addition, the appearance of such streaking problems increase with the use of higher line speeds (i.e., the speed at which the substrate is moving). This problem has, thus, resulted in the use of lower than desired production rates. Such uneven color problems have been experienced for decades without the cause being identified.

Accordingly, there is a need for a solution to this uneven color problem.

SUMMARY OF THE INVENTION

The present invention provides a solution to the problems associated with the uneven color appearance, at least in part, by providing a method of high speed coating a pigment-containing liquid coating material onto a moving substrate so as to avoid visible pigment separation in the coating material in its as coated state, at least on the surface of the coated layer to be viewed.

It has been found that the uneven color appearance experienced in prior art is the result of pigment separation that is visible, with normal unaided human eyesight, on a surface of the coated layer, typically its interface surface. As used herein, pigment separation is a non-uniform distribution or localized concentration of the pigment used in the liquid coating material. It has also been found that the use of a substantially straight wetting line when applying the coating material onto a moving substrate can significantly reduce, if not completely eliminate, this pigment separation and, thereby, the uneven color appearance problem. It has further been found that organosol coatings in general, and especially organosol coatings containing metallic or other flake-shaped pigments, are particularly prone to such pigment separation problems. Such pigment separation problems can be seen in coatings where pigments of different sizes and/or types, such as small particles and larger flakes, are both present in the coating material. Such pigment separation problems can also be problematic for translucent films designed to be displayed with backlighting when pigments of different sizes and/or types, such as smaller transparent pigments and larger opaque or flake pigments, are both present in the coating material. It has also been found that pigment separation problems are most noticeable on the interface surface or underside of the coated layer (i.e., the surface of the coated layer that once contacted the moving substrate). When a transparent coating (e.g., a convention clear coat) is positioned over the underside of the coated layer, pigment separation can be seen through the transparent coating.

In one aspect of the present invention, a method is provided that comprises providing a first substrate (e.g., a film, web or liner) having a coating surface to be coated and providing a pigment-containing liquid coating material. The coating material is applied to the surface of the first substrate along a substantially straight wetting line to form a coated layer having an interface surface in contact with the coating surface of the first substrate. The coating material is applied while the first substrate is moving at a high line speed of at least about 50 ft./min. (15.24 m/min.). The pigment-containing coating material is of the type that, without the use of a substantially straight wetting line, will exhibit visible (i.e., visible with normal unaided human eyesight) pigment separation on its interface surface when the coating material is coated onto the coating surface of the first substrate at the high line speed. For the purposes of the present invention, a wetting line is substantially straight when visible pigment separation does not occur at the high line speed being used. With regard to the present invention, a high line speed is when the first substrate is coated while moving at a rate of at least about 50 ft./min. (15.24 m/min.). It can be desirable for the wetting line to be sufficiently straight to permit line speeds of at least about 60 ft./min. (18.29 m/min.), without producing visible pigment separation on the surface of the coated material. It can also be desirable for the wetting line to be sufficiently straight to permit line speeds of at least about 70 ft./min. (21.34 m/min.), 80 ft./min. (24.38 m/min.), 90 ft./min. (27.43 m/min.) or 100 ft./min. (30.48 m/min.). It can further be desirable for the wetting line to be sufficiently straight to permit line speeds of greater than 100 ft./min. (30.48 m/min.).

This method can include removing the coated layer from the coating surface of the first substrate to expose the interface surface of the coated layer. A second substrate can then be provided and adhered to the adhering surface of the coated layer. The adhering surface of the coated layer is opposite its interface surface.

In another aspect of the present invention a method of making an article is provided. The method comprises making a coated layer by high speed coating a pigment-containing liquid coating material onto a substrate as described above. An article is then made using the coated layer. The article being so made can be a color coated article, where the method further comprises removing the coated layer from the coating surface of the first substrate to expose the interface surface of the coated layer. The article is then made, at least in part, by adhering the coated layer (e.g., with a pressure sensitive adhesive) to another substrate, with the interface surface exposed. This other substrate can form part (e.g., body part, trim, etc.) of a vehicle such as, for example, an automobile, aircraft or watercraft. The other substrate can also be an intermediate substrate, like a release liner, or a separate film or other part of an article made using the coated layer.

One method for applying coating material along a substantially straight wetting includes reverse roll application of the coating material. Reverse roll application can additionally provide quick changeover relative to die or slot feed coating methods. Reverse roll application includes rotating an applicator roll in a direction opposite to the direction of substrate movement at the point of contact between the liquid coating material and the applicator roll. This may include looping the web substrate backside surface around a feed roller rotating in a direction opposite to the direction of the applicator roll. The reverse roll application may be followed by wiping excess coating material from the coated substrate with a metering device or knife. The metering knife can be a notch bar. The metering function can also be provided by another roll, for example, a reverse rotating roll.

Reverse roll application can include providing a first feed roll rotating in a first direction and a second applicator roll rotating in a second direction opposite the first roll rotation direction, with the first and second rolls forming a roll gap therebetween. The two rolls reach a point of minimum clearance at the roll gap. The substrate to be coated, or first substrate, such as a web or liner, can be passed around the first roll under tension, and through the roll gap, with the first roll rotating at a speed and direction matching the speed and direction of the first substrate. The second roll may have liquid coating material deposited on the roll using many devices, including flow bars. The second roll may at least partially be disposed in a pan of liquid coating material, with the second roll rotation carrying the coating material into the roll gap and into contact with the first substrate coating surface moving in an the opposite direction to the second roll carrying the coating material. The coating material contacts the web or liner coating surface along a substantially straight wetting line near the roll gap. The straight wetting line reduces pigment agglomeration and resulting uneven color appearance in the finished product. The coated first substrate may have excess coating material wiped or metered by passing under and near a notch bar, knife, or a third rotating roll, with the web being disposed at a controlled notch bar gap distance from the notch bar.

Another method for providing a substantially straight dynamic wetting line can include die or curtain coating the first substrate with a pigment-containing coating material. The first substrate may be passed around a feed roller under tension and a die disposed near the first substrate driven by the first roller surface. Coating material may be applied through a die orifice to the first substrate surface. The die orifice may be oriented substantially parallel to the first substrate surface, and substantially orthogonal to the machine direction or direction of first substrate movement.

After applying the coating material to the first substrate along a substantially straight wetting line, the coating layer can be separated or stripped from the first substrate. In one method, a second substrate is applied and adhered to the coated first substrate. The second substrate and adhered coating layer may be removed together, peeling the coating layer away from the first substrate, exposing the side of the coating layer that previously adhered to the first substrate. The exposed coating layer surface has a substantially even color appearance due to the application of the coating material to the first substrate along the substantially straight wetting line.

In one use of the present invention, a paper or polyester web or liner is used as a first substrate. A metallic organosol is applied along a straight wetting line to the web. A second substrate including a pressure-sensitive adhesive and release liner is applied and adhered to the metallic organosol coated web. The release liner and pressure-sensitive adhesive are peeled off of the web, taking the adhered metallic organosol layer off with the release liner and pressure-sensitive adhesive. The underside of the metallic organosol layer, previously adhered to the web, forms the coated surface of the second substrate. The exposed surface has an even color appearance. In particular, the exposed surface is substantially free of longitudinal streaks in the machine direction.

DETAILED DESCRIPTION OF THE INVENTION

Figure 1:
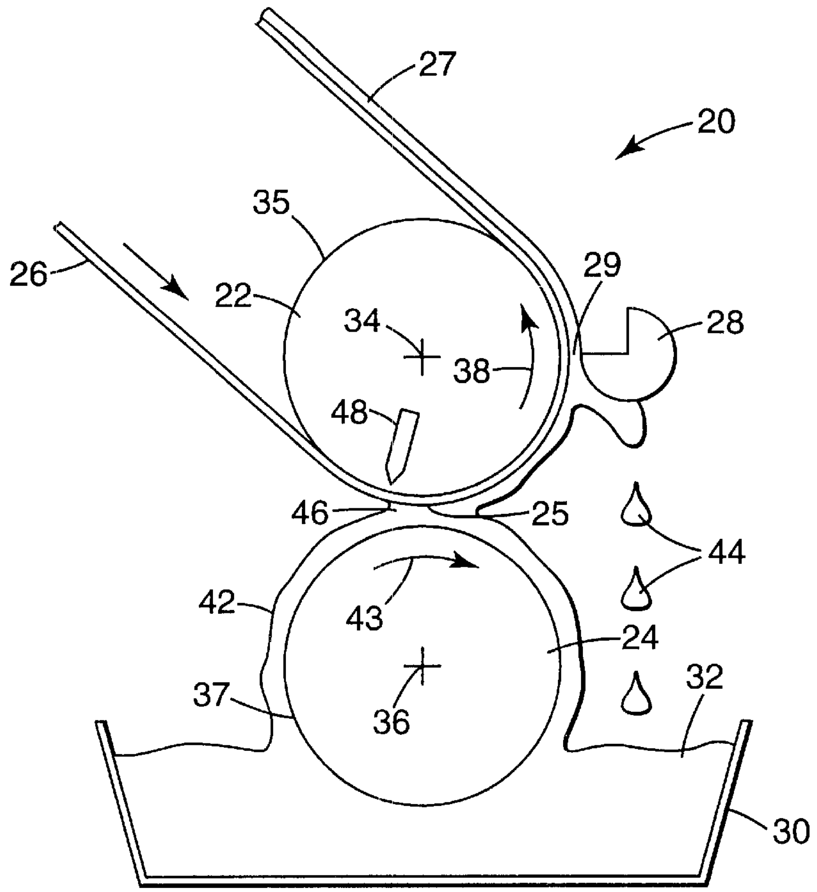
Fig. 1 PRIOR ART
FIG. 1 is a diagrammatic, side view of a web being coated with a forward dip roll coating device with notch bar.

FIG. 1 illustrates a prior art method used to coat substrates such as webs, belts or films, with a colored, pigment-containing liquid. Some coating liquids may be referred to as color dispersions. As used herein, "color dispersion" means a liquid having a homogenous distribution of pigment particles therein. The pigment particles can be colloidal particles, metal particles (typically in the form of flakes) and opaque pigment particles. A coating machine 20 is illustrated, having a first, feed roll 22, and a second, applicator roll 24, forming a roll gap 25 therebetween and having a casting web, belt, or liner 26 passing through roll gap 25 and disposed against first feed roll 22 along a web backside surface. Web 26 is often formed of paper or polyester. Second roll 24 is disposed within a coating material 32 contained within a feed pan 30. First roll 22 has a central axis 34, a surface 35, and is rotating in a first direction indicated at 38. Second roll 24 has a central axis 36, a surface 37, and is rotating in a second direction as indicated at 43. Coating machine 20 may also be seen to have a metering device, which can be a metering knife. In the embodiment illustrated, the metering knife is a notch bar 28. Notch bar 28 serves to meter or limit the thickness of coating material allowed to adhere to the web.

In use, coating material 32 is entrained by moving second roll surface 37, and is carried through an upstream meniscus region 42, into roll gap 25, through a downstream meniscus region, and back to feed pan 30. The amount of coating material that passes through roll gap 25 is determined by the gap between the rolls, viscosity behavior, speeds of the feed and applicator rolls, and the roll diameters. Often, coating material is rejected from the roll gap and flows down towards feed pan 30. Sometimes a rolling bank is formed in upstream meniscus region 42. The coating material carried by second roll 24 into roll gap 25 contacts web 26 along a dynamic wetting line, indicated at 46, where the coating material first wets the web on the web coating surface. Some of the coating material adheres to web 26 and is carried along by web 26 to notch bar 28. At the downstream side of the roll gap, a film split separates coating material into a stream that re-enters feed pan 30, and a stream that continues along the web toward notch bar 28.

A bar gap 29 is formed between notch bar 28 and web 26, with the bar gap controlling the coating thickness by metering the amount of coating material allowed to pass between web 26 and notch bar 28, forming a coated web 27. Notch bar 28 wipes off excess coating material, leaving a layer on the web surface. The thickness of the coating formed downstream of the notchbar depends on bar gap 29, viscosity behavior, speed of feed roll 22, diameter the notch bar 28, and the diameter of feed roll 22. Excess coating material, wiped by notch bar 28, may be seen as rainfall 44. Rainfall 44 may be discontinuous or continuous across the coating width. A viewpoint is indicated at 48, illustrating the orientation of a camera point of view, used by applicants in a specially adapted, transparent first feed roll 22 in order to view wetting line 46.

Figure 2:
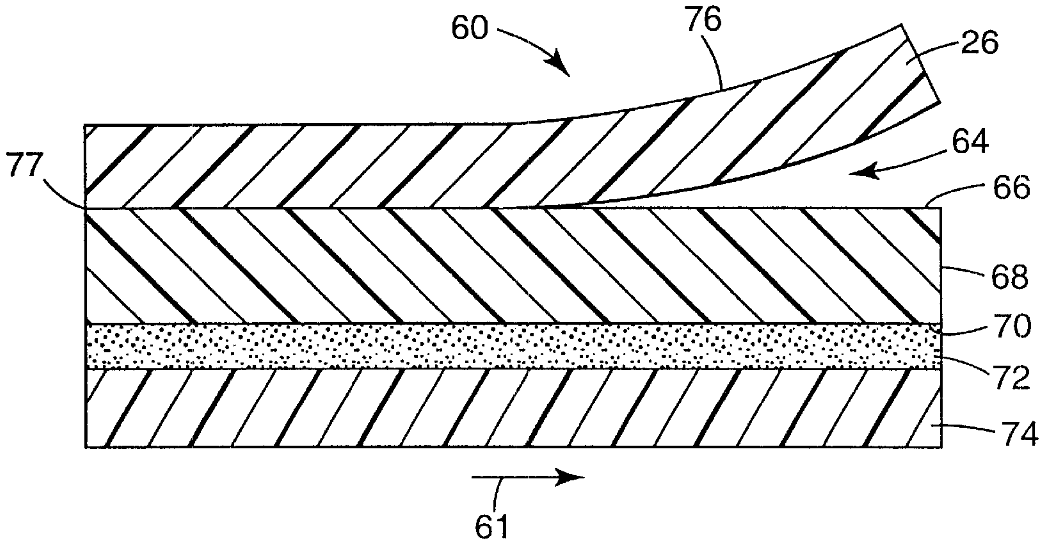
FIG. 2 is a transverse, cross-sectional view of a coated web, after further laminating and partial removal or peeling off to expose the web or roll side surface.

FIG. 2 illustrates an intermediate laminate product 60, including coated web or liner 26. The laminate machine direction is indicated at 61. Web 26 includes a roll side or back side 76 which was formerly carried against feed roll 22. Laminate 60 includes a decorative film layer 68 which can be the result of coating onto web 26 along a web-coating material interface or coating surface 77. Decorative film or coating layer 68 includes a dynamic wetting line side or roll side surface 66 and a notch bar side or air side 70. Dynamic wetting line side 66 is the coating layer surface that was in contact with web 26, while notch bar side 70 is the coating layer side that was wiped by the knife or notch bar. After coating material layer 68 has been adhered to web 26, a pressure-sensitive adhesive layer 72 may be deposited along coating layer notch bar side 70. A release layer 74 may be further formed against pressure-sensitive adhesive layer 72.

After forming laminate product 60, coating layer 68 may be removed or peeled off of web 26 along web-coating layer interface 77, as indicated at 64, thus exposing coating layer roll side surface 66 as the surface exposed to view. In general, web 26 may be viewed as a first substrate, and pressure-sensitive adhesive 72, or pressure-sensitive adhesive 72 in combination with release liner 74, viewed as a second substrate. The second substrate may be used to peel off the coating layer from the first substrate after the second substrate has been adhered to the coating layer. Imperfections in the coating layer roll side surface 66 may be very visible, as the surface is now directly exposed to view. In laminates where the coating material is opaque, coating layer surface 66 would be invisible under coating layer 68, if not for the subsequent peel off and exposure. In laminates where the coating material is transparent, pigment separation in coating layer surface 66 may be visible without peel off, but is much more noticeable after the subsequent peel off and exposure.

Applicants believe that one reason for the difficulty in creating the present invention is that the interface between web 26 and coating material layer 68 is not visible during manufacture, and, as the peel off step is not common to most coating processes, interface 77 is not visible after manufacture either. Even where coating layer surface 66 is visible, imperfections such as pigment separation are not commonly visible until after the drying of coating layer 68 and after the peel off. The pigment separation is not commonly visible in time to control the process differently, or even take timely note of process differences that might be responsible.

Coating Materials

Exemplary coating materials that can exhibit visible pigment separation, when not processed using a substantially straight wetting line, include organosols such as, for example, a vinyl organosol. An organosol is defined as a colloidal dispersion of polymer particles in a diluent, which provides reasonable coating viscosity at high solids concentrations. A blend of solvents and plasticizers allows fusion of the polymer particles as the coating is cured. An admixture of other resins and fillers may be used for functional enhancements. Pigments are added to provide a desired color. Other coating materials that can exhibit visible pigment separation include those disclosed in WO 88/07416 (Spain et al.) to Avery Intl Corp, EP 0266109B1 (Ellison et al.) to Rexham Industries Corp., and WO 89/04218 (Hayward et al.) to Eastman Kodak Co., all of which are incorporated herein by reference in their entirety.

Exemplary coating materials that can exhibit visible pigment separation include those having 100 parts by weight of vinyl chloride resin, with 20 to 50 parts plasticizer. Pigment is added as necessary up to 100 parts, but for the typical translucent or metallic coating a more common maximum is 20 parts pigment. To this is added 20 to 40 parts by weight volatile organic compounds, choosing a blend of ketone and aromatic compounds with an aliphatic diluent. All materials are subjected to high shear milling as is experienced in a media mill, except that flake pigments are stirred in after the milling operation.

An exemplary coating material that can exhibit the visible pigment separation phenomenon contains for 100 parts by weigh vinyl chloride resin, 20 to 50 parts plasticizer, 1 part phthaloddcyanine blue pigment, 1 part quinacridone gold pigment, ½ part carbon black pigment, and 30 parts of the blended volatile compounds diisobutylketone and xylene. During the milling operation, there may be added up to 10 parts aliphatic hydrocarbon to control viscosity within the range 1,000–3,000 centipoise. Two parts aluminum flake is stirred in, with the flakes having a mean particle size of 30–40 microns. It is believed that the characteristics of the preceding example that make it prone to visible pigment separation are the fine particle size distribution of typical carbon black and transparent dispersions of phthalocyanine blue pigment, as well as a transparent quinacridone. These fine particle dispersions are in contrast to the coarse aluminum flake.

It has been found that, in general, coating materials that are prone to pigment separation have pigment particles with significantly different sizes. It is believed that a difference in pigment particle size and/or shape can result in a variation in the mobility of the different size or shaped particles in the coating material liquid. It is further believed that the difference in mobility can affect whether the coating material is prone to pigment separation. In particular, when the pigment particles include two or more different types having different sizes, it is believed that a difference between the particle types of at least about 10 times their respective largest major linear dimensions can affect whether the coating material is prone to visible pigment separation.

Coating Material Test Method

It has been found that pigment separation can occur at or near the wetting line when applying liquid coating materials. The pigment separation phenomenon is similar to the paint flow defects known as floating and silking, except that the pigment separation defects are typically visible at the interface surface of the coated layer, rather than the exposed surface. The following is an exemplary test method for determining pigment separation prone liquid coating materials. This test method provides a demonstration of how prone a particular coating material is to exhibiting pigment separation. This test method also provides a means of predicting which coating materials are susceptible to pigment separation defects.

The materials and equipment that can be used to perform this test method are a transparent polyester film, e.g., 50 microns thick, 25–30 cm wide and 100 cm long, and an application device or fixture such as, for example, a conventional film casting knife. Satisfactory results have been obtained using a transparent polyester film manufactured by Minnesota Mining and Manufacturing Company under the product number 41-4400-1092-8 and a BYK-Gardner Film Casting Knife, having a product designation PAG-4343, made by BYK-Gardner USA, Columbia, Md. Other transparent films and applicators may also be used.

Figure 6:
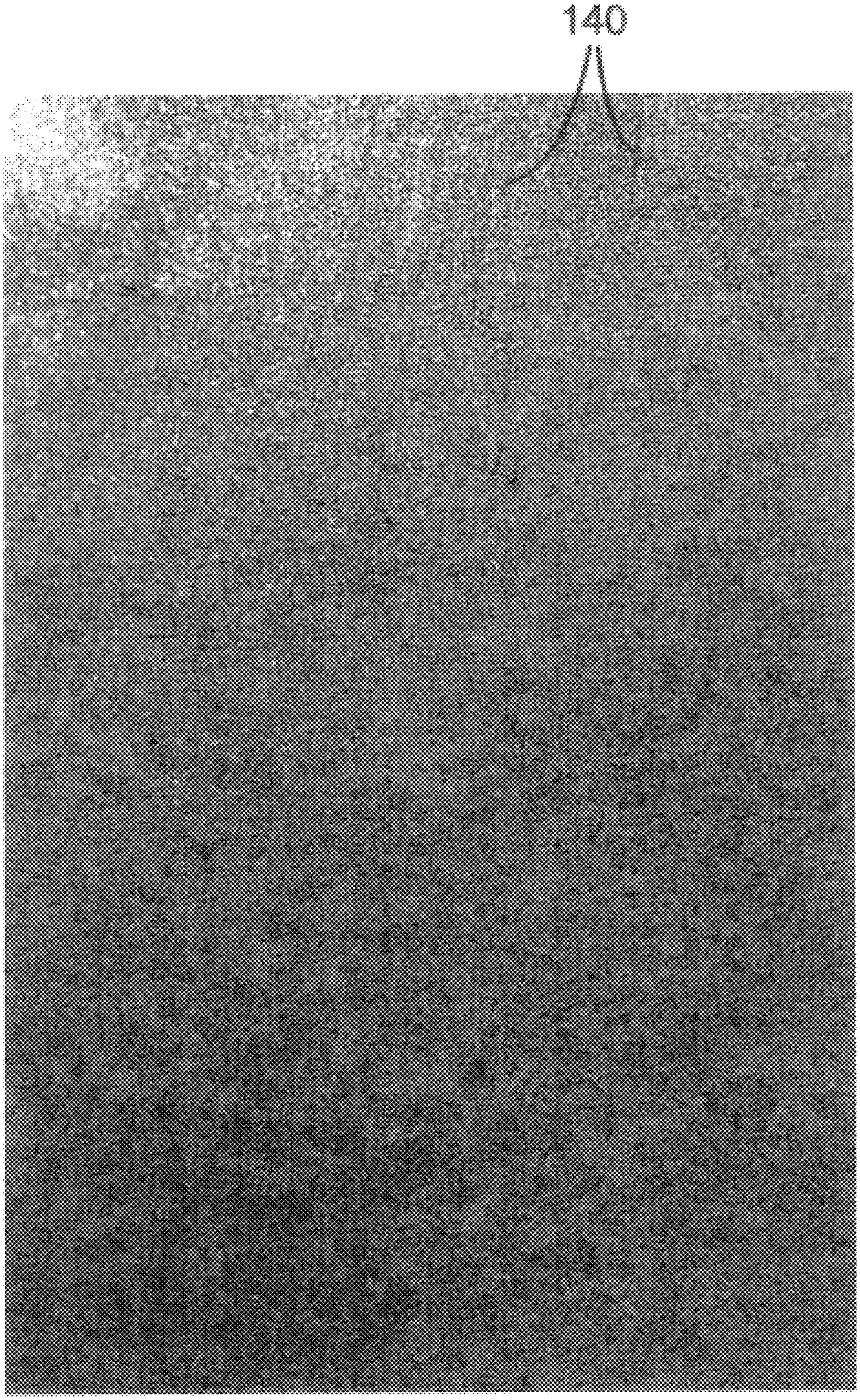
FIG. 6 is a plan view of the interface surface of an exemplary coated layer exhibiting an uneven color appearance resulting from pigment separation.

First, position the transparent film on a smooth flat surface, like the top surface of a flat table. Tape the polyester film down on the smooth flat surface. Place the application device near one end of the transparent film. Adjust the applicator to provide a 100 micron (4 mils) gap between the surface of the applicator (e.g., the knife edge) and the transparent film. Place approximately 10 milliliters of coating material in a generally circular area near the front edge of one end of the polyester film. Allow the coating material to spread to an approximate diameter of about 3–4 cm. The applied coating material can be spread by keeping the polyester film stationary and drawing down the applicator lengthwise across the length of the polyester film at a speed of, for example, about 30 centimeters (1 ft.) per second. It is not necessary for the test, but for ease of handling, the prepared sample may be dried for 5 minutes at 100° C. Look at the interface surface of the sample coated layer (i.e. the surface in contact with the transparent film) through the backside of the transparent film. A coating material prone to pigment separation will show visible streaks, swirls or other shapes having a color intensity that is darker than that of the surrounding coated layer. Examples of actual pigment separation defects (e.g., streaking) can be seen on the interface surface of the coated layer shown in FIG. 6.

In an attempt to determine the cause of pigment separation at high line speeds, a camera was installed within feed roll 22, at point of view 48. A special roll was created, Is formed of a clear glass material, to be used as feed roll 22. A relatively clear web material, a polyester, was also used. In this way, wetting line 46 could be viewed from within feed roll 22. An attempt was then made to observe the coating process in regimes where pigment separation did and not occur.

Figure 3A:
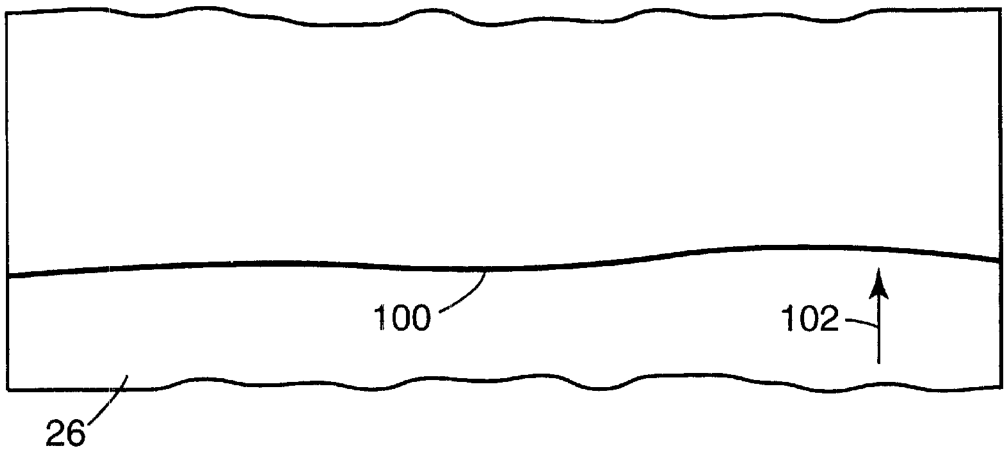
FIG. 3A is a diagrammatic top view of a web being coated, including a dynamic, straight wetting line observed at low speeds using specialized equipment similar to the equipment of FIG. 1.

FIG. 3A is a top view of a web such as web 26 being coated. Included in this figure is a substantially straight, dynamic wetting line 100. The web 26 is moving in direction 102 using the specialized roll and camera equipment previously discussed with a roll machine similar to that of FIG. 1. At low roll speeds, no pigment separation was visible. In particular, no pigment separation or agglomeration of pigment was observed in real time.

Figure 3B:
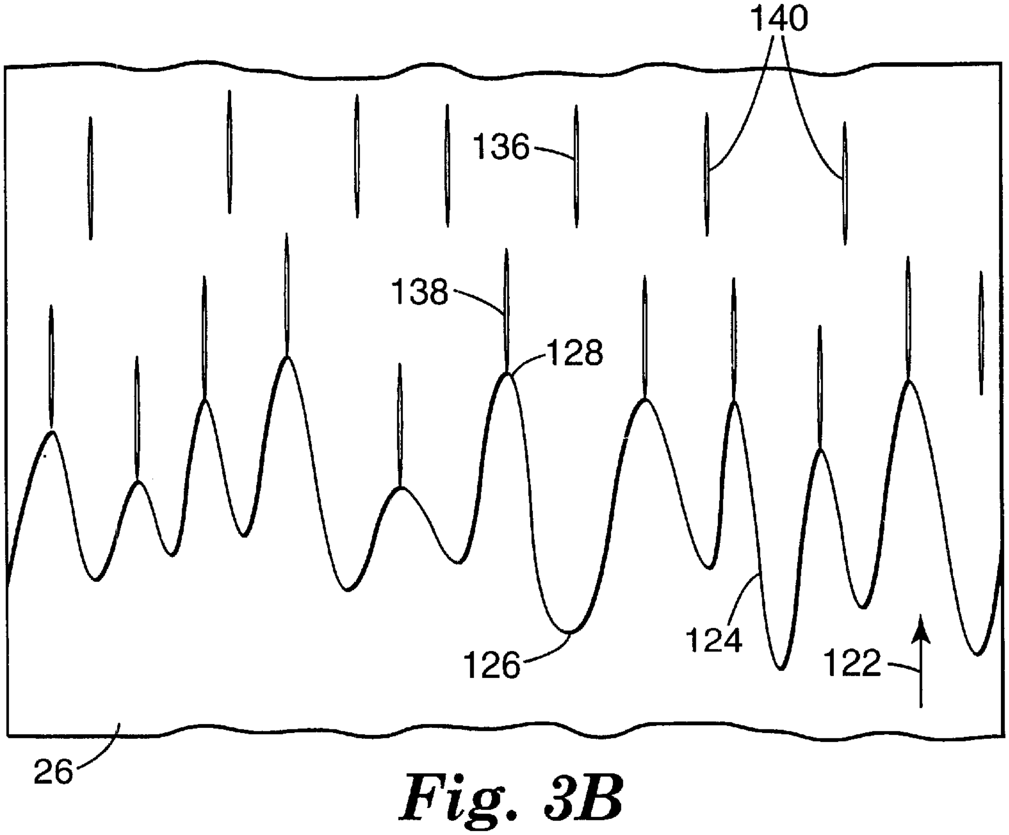
FIG. 3B is a diagrammatic top view of a web being coated, including a dynamic, irregular wetting line and streaking observed at high speeds using specialized equipment similar to the equipment of FIG. 1.

FIG. 3B is a top view of a web as in FIG. 3A, but at a higher line speed in direction 122. At a higher speed, a large number of streaks 140 were visible in real time. An uneven wetting line 124 was also observed. Applicants believe that streaks 140 result from the agglomeration of pigment particles sticking together, forming a smaller number of larger pigment particles from larger numbers of smaller pigment particles. Applicants believe the agglomeration of pigment particles, and the resulting loss of coverage, is responsible for the eventual pigment separation defects observed after peel off and exposure of the coated surface. In particular, Applicants noticed the correlation between locations having changes in wetting line direction and locations having streaks. Changes in wetting line directions 126 and 128, were, for example, observed to correlate with streaks 136 and 138, respectively. As a result of experiments, including the results highlighted in FIGS. 3A and 3B, Applicants believe that pigment separation may be prevented or greatly reduced by coating along a straight dynamic wetting line.

Figure 4:
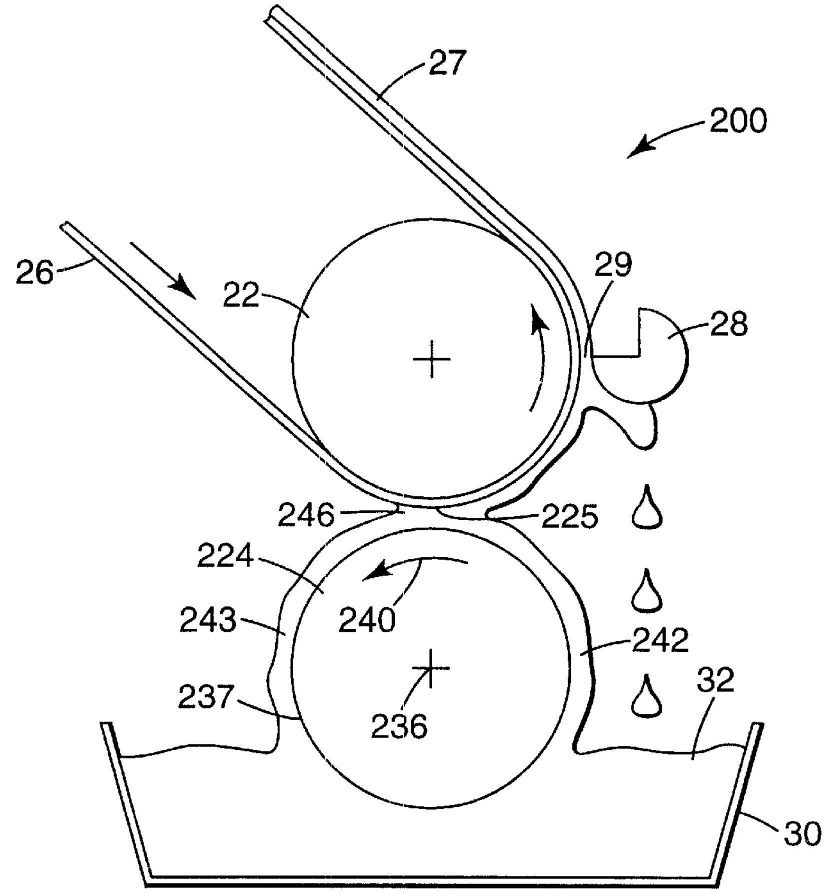
FIG. 4 is a diagrammatic side view of a web being coated with a reverse application dip roll coating device with notch bar.

FIG. 4 illustrates a coating machine 200 that Applicants have devised to coat along a straight dynamic wetting line at relatively high line speeds. Coating machine 200 allows for web coating without pigment separation at speeds significantly greater than possible with previous coating machines, such as coating machine 20 of FIG. 1. Coating machine 200 shares some similar components with coating machine 20 of FIG. 1, with these components being similarly numbered. Web 26 may be seen to have a back side looped around first or feed roller 22, and passing under knife or notch bar 28 through bar gap 29. A second or applicator roll 224 may be seen to rotate in a direction opposite to that of first roll 22, as indicated at 240. Applicator roll 224 has a roll surface 237 and a roll central axis 236. Applicator roll 224 entrains the coating material 32 along surface 237, forming an upstream meniscus 242, before the coating material 32 passes into a roll gap 225 between feed roll 22 and applicator roll 224. The coating material 32 contacts the coating surface of the web 26 along a dynamic wetting line 246, with material not coating web 26 passing to a downstream meniscus region 243. Downstream meniscus region 243 is located on the "back side" of applicator roll 224, the roll side downstream of roll gap 225. Dynamic wetting line 246 is disposed further into roll gap 225 than dynamic wetting line 46 is disposed into roll gap 25 of FIG. 1.

In operation, applicator roll 224 should be rotated at a higher speed than feed roll 22. Feed roll 22 typically paces or matches the speed of web 26. Applicator roll 224 preferably is rotated at a speed greater than about three times the speed of feed roll 22. Applicator roll 224 is more preferably rotated between about three and five times the speed of feed roll 22. Most preferably, applicator roll 224 is rotated between about four and about five times the roll speed of feed roll 22. As used herein, "roll speed" refers to the surface speed of the roll at the roll gap. In particular, larger diameter rolls will have higher roll speeds than smaller diameter rolls at the same rotation rate.

In operating coating machine 200, the back side of applicator roll 224 may be inspected, and the inspection used to advantage in running the coating machine to reduce or eliminate pigment separation. The coating material on the applicator roll back side region has a thickness and a surface appearance. Applicants have discovered that pigment separation is associated with the uneven appearance of the roll back side. The uneven appearance of the roll back side correlates with uneven distribution of coating material over the roll back side, having thin layer regions and thick layer regions. The even appearance is a smooth, glossy surface appearance, rather than mottled, spotted, or striped as when the appearance is uneven. When the back side roll surface is uneven, pigment separation may very well be occurring, unknown and invisible to the operators. The resulting pigment separation may not be known until a much later removal of the coated material layer.

The uneven applicator roll back side appearance may be observed using human or machine visual inspection. Some methods use machine measurement of coating material thickness over the roll back side to measure the evenness. When the uneven applicator roll back side is observed, the operation of coating machine 200 may be altered to make the back side appearance even again. Operating parameters such as roll speeds, roll speed ratios, roll gap and coating material properties may be adjusted until the roll back side has an even thickness over the back side.

Applicants have used coating machine 200 to coat at line or liner speeds faster than possible with a machine such as coating machine 20 of FIG. 1. In particular, at a roll gap of about 15 mils, and a bar gap of about 5 mils, a coating material viscosity of about 1000–3000 centipoise, and a resulting coating thickness of about 3 mils, forward roll coating machine 20 was able to run at a line speed of about 50 feet per minute without pigment separation. The aforementioned line speed was about the highest line speed that could be used without having pigment separation at the above conditions. Using the same coating thickness and viscosity, reverse roll coating machine 200 was able to be run at speeds of 100, and even 130 feet per minute, without pigment separation.

Figure 5:
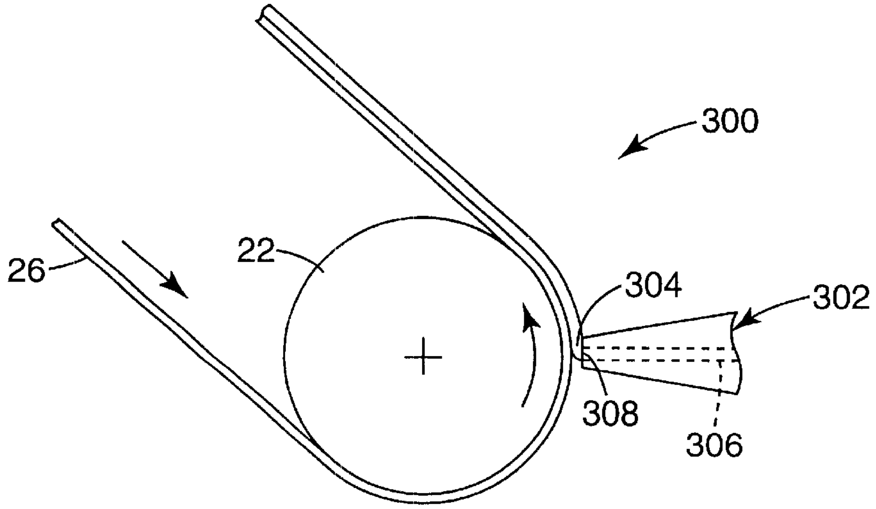
FIG. 5 is a diagrammatic side view of a web being coated with a die coating device.

FIG. 5 illustrates a die coating machine 300 which Applicants believe will also provide a straight dynamic wetting line according to the present invention. Die coating machine 300 includes a first feed roll 22 and web 26 as previously described. A die head 302 may be seen to be disposed against web 26, separated by a gap 304. A coating material channel 306 is disposed within die head 302, terminating in an orifice 308. In one embodiment, orifice 308 is formed of a single slit disposed substantially parallel to the surface of web 26. In another embodiment, orifice 308 is formed as a series of orifices aligned along an axis substantially parallel to the surface of web 26. Coating material may be provided to die head channel 306 using conventional pumps and apparatus well known to those skilled in the art.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope should, therefore, only limited to the scope of the appended claims and the equivalents thereof.

What is claimed is:

1. A method of high speed coating a pigment-containing material onto a substrate so as to avoid visible pigment separation in the material in its as coated state, said method comprising:

providing a first substrate having a coating surface to be coated;

providing a pigment-containing liquid coating material; and applying the coating material to the surface of the first substrate along a substantially straight dynamic wetting line to form a coated layer having an interface surface in contact with the coating surface of the first substrate, while the first substrate is moving at a high line speed of at least about 50 ft./min. (15.24 m/min.), wherein the first substrate is removable from the coated layer and when the first substrate is removed from the coated layer, the coated layer exhibits no visible pigment separation on its interface surface.

2. The method according to claim 1, wherein in said step of applying the coating material to the surface of the first substrate, the first substrate is moving at a high line speed of at least about 60 ft./min. (18.29 m/min.), and the pigment-containing coating material is of the type that, without the use of a substantially straight wetting line, will exhibit visible pigment separation on its surface when the coating material is coated onto the coating surface while the first substrate is moving at the high line speed.

3. The method according to claim 1, wherein in said step of applying the coating material to the surface of the first substrate, the first substrate is moving at a high line speed of at least about 70 ft./min. (21.34 m/min.), and the pigment-containing coating material is of the type that, without the use of a substantially straight wetting line, will exhibit visible pigment separation on its surface when the coating material is coated onto the coating surface while the first substrate is moving at the high line speed.

4. The method according to claim 1, wherein in said step of applying the coating material to the surface of the first substrate, the first substrate is moving at a high line speed of at least about 80 ft./min. (24.38 m/min.), and the pigment-containing coating material is of the type that, without the use of a substantially straight wetting line, will exhibit visible pigment separation on its surface when the coating material is coated onto the coating surface while the first substrate is moving at the high line speed.

5. The method according to claim 1, wherein in said step of applying the coating material to the surface of the first substrate, the first substrate is moving at a high line speed of at least about 90 ft./min. (27.43 m/min.), and the pigment-containing coating material is of the type that, without the use of a substantially straight wetting line, will exhibit visible pigment separation on its surface when the coating material is coated onto the coating surface while the first substrate is moving at the high line speed.

6. The method according to claim 1, wherein in said step of applying the coating material to the surface of the first substrate, the first substrate is moving at a high line speed of at least about 100 ft./min. (30.48 m/min.), and the pigment-containing coating material is of the type that, without the use of a substantially straight wetting line, will exhibit visible pigment separation on its surface when the coating material is coated onto the coating surface while the first substrate is moving at the high line speed.

7. The method according to claim 1, wherein the coated layer has an adhering surface opposite its interface surface and said method further comprises applying an adhesive to the adhering surface, providing a second substrate, and adhering the second substrate to the adhering surface of the coated layer.

8. The method according to claim 1, wherein said method further comprises providing a die having at least one orifice extending through to a die surface, with the die surface being disposed a gap distance from the coating surface of the first substrate, and said step of applying the coating material includes applying the coating material through the at least one orifice, across the gap distance and onto the coating surface of the first substrate along the substantially straight wetting line.

9. The method according to claim 1, wherein the first substrate has a back side opposite to its coating surface, and said method further comprises:

providing a feed roll rotatable about a first roll axis and having a first roll surface;

extending the back side of the first substrate against the first roll surface under tension;

rotating the feed roll about the first roll axis to cause the first roll surface to move in a first direction; and moving the first substrate longitudinally along the first direction at the high line speed, and said step of applying the coating material includes applying the coating material to the coating surface while the first substrate is moving along the first direction.

10. The method according to claim 9, wherein the said method further comprises:

providing an applicator roll rotatable about a second roll axis and having a second roll surface;

disposing the second roll surface a roll gap from the first roll surface; and disposing the first substrate within the roll gap, and said step of applying the coating material includes transferring the coating material from the second roll surface to the coating surface of the first substrate while rotating the applicator roll in a direction opposite to the first direction.

11. The method according to claim 10, wherein said step of applying the coating material includes forming the substantially straight wetting line between the coating material and the first substrate by controlling the rotation speed of the applicator roll within upper and lower speed limits relative to the rotation speed of the feed roll.

12. The method according to claim 11, wherein the rotation speed of the applicator roll is maintained between about three and five times the rotation speed of the feed roll.

13. The method according to claim 1, wherein the coating material being provided comprises an organosol.

14. The method according to claim 1, wherein the coating material being provided comprises an organosol containing metallic flakes.

15. The method according to claim 1, wherein the coating material being provided is a color dispersion coating material.

16. The method according to claim 1, wherein the coating material being provided comprises a liquid, greater than about 60 weight percent solids, a plurality of pigment particles having a range of sizes suspended within the liquid, and a viscosity of greater than about 1000 centipoise.

17. The method according to claim 1, wherein the pigment particles include at least a first particle type and a second particle type, the first and second particle types have different sizes, the first particle type has a first largest major linear dimension, the second particle type has a second largest major linear dimension, and the second largest major linear dimension is at least about ten times the first largest major linear dimension.

18. The method according to claim 17, wherein the first particle type includes vinyl particles and the second particle type includes flakes.

19. The method according to claim 18, wherein the second particle type includes metallic flakes.

20. A method of making an article, said method comprising:

making a coated layer by high speed coating a pigment-containing material onto a substrate according to claim 1; and making an article using the coated layer.

21. The method of making an article according to claim 20, wherein the article is a color coated article, said method further comprising removing the coated layer from the coating surface of the first substrate to expose the interface surface of the coated layer; and said step of making the article includes adhering the coated layer to a second substrate, with the interface surface exposed.

22. The method of making an article according to claim 21, wherein the second substrate forms part of a vehicle.

23. An article according to claim 20.

24. A method of high speed coating a pigment-containing material onto a substrate so as to avoid visible pigment separation in the material in its as coated state, said method comprising:

providing a first substrate having a coating surface to be coated;

providing a pigment-containing liquid coating material; and applying the coating material to the surface of the first substrate to form a coated layer having an interface surface in contact with the coating surface of the first substrate, while the first substrate is moving at a high line speed of at least about 50 ft./min. (15.24 m/min.), said applying comprising moving the first substrate in a first direction at a first speed;

transferring the coating material from an applicator roll to the coating surface of the first substrate while rotating the applicator roll in a second direction opposite to the first direction, wherein a rotation speed of the applicator roll is maintained between about three and five times the first speed; and wherein the first substrate is removable from the coated layer and when the first substrate is removed from the coated layer, the coated layer exhibits no visible pigment separation on its interface surface.

25. A method of high speed coating a pigment-containing material onto a substrate so as to avoid visible pigment separation in the material in its as coated state, said method comprising:

providing a first substrate comprises a liner, said first substrate having a coating surface to be coated;

providing a pigment-containing liquid coating material; and applying the coating material to the surface of the first substrate along a substantially straight dynamic wetting line to form a coated layer having an interface surface in contact with the coating surface of the first substrate, while the first substrate is moving at a high line speed of at least about 50 ft./min. (15.24 m/min.), wherein the liner is removable and when the liner is removed, the coated layer exhibits no visible pigment separation on its interface surface.

26. A method of high speed coating a pigment-containing material onto a substrate so as to avoid visible pigment separation in the material in its as coated state, said method comprising:

providing a first substrate comprising a liner, said first substrate having a coating surface to be coated;

providing a pigment-containing liquid coating material; and applying the coating material to the surface of the first substrate to form a coated layer having an interface surface in contact with the coating surface of the first substrate, while the first substrate is moving at a high line speed of at least about 50 ft./min. (15.24 m/min.), said applying comprising moving the first substrate in a first direction at a first speed;

transferring the coating material from an applicator roll to the coating surface of the first substrate while rotating the applicator roll in a second direction opposite to the first direction, wherein a rotation speed of the applicator roll is maintained between about three and five times the first speed; and wherein the liner is removable and when the liner is removed, the coated layer exhibits no visible pigment separation on its interface surface.

* * * * *

UNITED STATES PATENT AND TRADEMARK OFFICE
CERTIFICATE OF CORRECTION

PATENT NO. : 6,666,946 B2
DATED : December 23, 2003
INVENTOR(S) : Pekurovsky, Mikhail L.

It is certified that error appears in the above-identified patent and that said Letters Patent is hereby corrected as shown below:

Title page,
Item [56], References Cited, U.S. PATENT DOCUMENTS, delete "5,609,932", insert in place thereof -- 5,609,923 --;

Column 3,
Line 25, insert -- line -- following "wetting";
Line 54, delete "the" following "an";

Column 4,
Line 64, delete "homogenous", insert in place thereof -- homogeneous --;

Column 5,
Line 41, insert -- of -- following "diameter";

Column 6,
Line 58, delete "weigh", insert in place thereof -- weight --;
Line 59, delete "phthaloddcyanine", insert in place thereof -- phthalocyanine --;

Column 8,
Line 3, delete "Is" following "created";
Line 8, delete "regimes",insert in place thereof -- regimens --;
Line 9, delete "and" following "did";

Column 10,
Line 1, insert -- be -- following "only";

UNITED STATES PATENT AND TRADEMARK OFFICE

CERTIFICATE OF CORRECTION

PATENT NO. : 6,666,946 B2
DATED : December 23, 2003
INVENTOR(S) : Pekurovsky, Mikhail L.

It is certified that error appears in the above-identified patent and that said Letters Patent is hereby corrected as shown below:

Column 12,
Line 55, delete "comprises", insert in place thereof "comprising".

Signed and Sealed this

First Day of June, 2004

JON W. DUDAS
*Acting Director of the United States Patent and Trademark Office*